US00RE48619E

(19) United States
(12) Reissued Patent
Barlettano

(10) Patent Number: US RE48,619 E
(45) Date of Reissued Patent: Jul. 6, 2021

(54) PERSONAL AIR COOLER

(71) Applicant: ONTEL PRODUCTS CORPORATION, Fairfield, NJ (US)

(72) Inventor: Scott Barlettano, Wayne, NJ (US)

(73) Assignee: ONTEL PRODUCTS CORPORATION, Fairfield, NJ (US)

(21) Appl. No.: 29/760,128

(22) Filed: Nov. 30, 2020

Related U.S. Patent Documents

Reissue of:
(64) Patent No.: Des. 852,340
Issued: Jun. 25, 2019
Appl. No.: 29/674,634
Filed: Dec. 21, 2018

(51) LOC (13) Cl. ..... 23-04
(52) U.S. Cl.
USPC ..... D23/333
(58) Field of Classification Search
USPC ..... D23/314, 317, 324, 325, 327, 329, 332, D23/333, 335, 336, 337, 338, 351, 355
CPC .... F24F 1/00; F24F 1/0007; F24F 1/02; F24F 1/08; F24F 1/42; F24F 1/56; F24F 1/60; F24F 3/044; F24F 3/048; F24F 3/16; G05D (Continued)

(56) References Cited

U.S. PATENT DOCUMENTS

D185,748 S 7/1959 Goettl
D188,357 S * 7/1960 Klotz, Jr. ..... D23/333

(Continued)

FOREIGN PATENT DOCUMENTS

CN 106091220 A 11/2016
CN 107327992 A 11/2017

(Continued)

OTHER PUBLICATIONS

Evapolar EV1000CART Replacement Evaporative Cartridge for EV-1000 evaLIGHT Personal Air Cooler and Humidifier, www.amazon.com/Evapolar-EV1000CART-Replacement-Evaporative-Humidifier/dp/B06XT5B742, retrieved Oct. 31, 2018.

(Continued)

*Primary Examiner* — Philip S Hyder
(74) *Attorney, Agent, or Firm* — Dickinson Wright PLLC

(57) CLAIM

I claim the ornamental design for a personal air cooler, as shown and described.

DESCRIPTION

*This application is a reissue application for U.S. Design Pat. No. D. 852,340, which issued on Jun. 25, 2019, from U.S. Design application Ser. No. 29/674,634, filed on Dec. 21, 2018, the contents of which is entirely incorporated by reference herein.*

FIG. 1 is a top-side perspective view of a personal air cooler;
FIG. 2 is a front view of the personal air cooler of FIG. 1;
FIG. 3 is a left side view of the personal air cooler of FIG. 1;
FIG. 4 is a rear view of the personal air cooler of FIG. 1;
FIG. 5 is a right side view of the personal air cooler of FIG. 1;
FIG. 6 is a top view of the personal air cooler of FIG. 1; and,
FIG. 7 is a bottom view of the personal air cooler of FIG. 1.
The broken lines in the drawings illustrate portions of the personal air cooler that form no part of the claimed design.

1 Claim, 7 Drawing Sheets

Matter enclosed in heavy brackets [ ] appears in the original patent but forms no part of this reissue; matter printed in italics indicates the additions made by reissue.

*(Amended)*

(58) Field of Classification Search
CPC ..... 23/1905; G05D 23/1932; G05D 23/1902; G05D 23/1931; G05B 19/0426; G05B 19/409; G05B 15/02
See application file for complete search history.

(56) References Cited

U.S. PATENT DOCUMENTS

| | | | | | |
|---|---|---|---|---|---|
| 3,176,117 | A | * | 3/1965 | Knoll | F24H 3/0411 165/121 |
| D279,815 | S | | 7/1985 | Yuen | |
| D282,101 | S | * | 1/1986 | Yuen | D23/328 |
| D282,102 | S | * | 1/1986 | Yuen | D23/328 |
| D291,350 | S | | 8/1987 | Sherman | |
| D313,069 | S | * | 12/1990 | McCormick | D23/335 |
| 4,977,755 | A | * | 12/1990 | Tulley | F24F 5/0035 220/495.01 |
| D319,498 | S | * | 8/1991 | Huang | D23/335 |
| 5,162,088 | A | | 11/1992 | Peng et al. | |
| 5,309,726 | A | | 5/1994 | Asbridge | |
| D361,828 | S | | 8/1995 | Chen | |
| D384,407 | S | * | 9/1997 | Yamada | D23/351 |
| D402,745 | S | * | 12/1998 | Termeer | D23/364 |
| D402,746 | S | * | 12/1998 | Clark | D23/364 |
| D414,253 | S | | 9/1999 | Kobayashi | |
| D416,993 | S | * | 11/1999 | Dong | D23/333 |
| D433,111 | S | | 10/2000 | Wright | |
| D448,071 | S | * | 9/2001 | Birdsell | D23/335 |
| D453,558 | S | * | 2/2002 | Segawa | D23/338 |
| D468,005 | S | * | 12/2002 | Bailey | D13/168 |
| D516,689 | S | * | 3/2006 | Salmon | D23/355 |
| D536,780 | S | * | 2/2007 | Lerche | D23/393 |
| D543,614 | S | | 5/2007 | Chen | |
| D553,725 | S | | 10/2007 | Shimizu | |
| D559,973 | S | | 1/2008 | Rabito | |
| D594,960 | S | | 6/2009 | Orihara | |
| D606,645 | S | | 12/2009 | Orihara | |
| D616,080 | S | | 5/2010 | Ching | D23/332 |
| D691,250 | S | * | 10/2013 | Chan | D23/332 |
| D733,273 | S | | 6/2015 | Jeon | |
| D733,860 | S | | 7/2015 | Konno | |
| D769,431 | S | * | 10/2016 | Lopez | D23/324 |
| D791,290 | S | * | 7/2017 | Shapiro | D23/332 |
| D804,001 | S | | 11/2017 | Cartwright | |
| D827,115 | S | | 8/2018 | Petersen | |
| D848,593 | S | * | 5/2019 | Exley | D23/351 |
| D849,220 | S | * | 5/2019 | Fang | D23/364 |
| D852,340 | S | | 6/2019 | Barlettano | |
| 2014/0260402 | A1 | * | 9/2014 | Varma | F28C 3/08 62/314 |
| 2015/0247644 | A1 | | 3/2015 | Stearns | |
| 2017/0138650 | A1 | | 5/2017 | Eiserer | |

FOREIGN PATENT DOCUMENTS

| | | | |
|---|---|---|---|
| CN | 207527751 | U | 6/2018 |
| CN | 209689113 | U | 11/2019 |
| CN | 210290192 | U | 10/2020 |
| EP | 001712704-0001 | | 6/2010 |
| EP | 0017127704-0001 | | 6/2010 |
| GB | 2420083 | A | 5/2006 |
| JP | 1374275 | | 11/2009 |
| JP | 1388881 | | 5/2010 |
| KR | 100543336 | B1 | 1/2006 |
| KR | 30-0764177 | | 10/2014 |
| KR | 30-0865259 | | 7/2016 |
| WO | 2005073642 | A1 | 8/2005 |
| WO | 2018058132 | A1 | 3/2018 |

OTHER PUBLICATIONS

Domus, vol. 767, Jan. 31, 1995, p. 108, Docket No. HB07009193: Design Division of the Japan Patent Office.
GDSTIME EC Cooling Fan, www.amazon.com/dp/B07H8W376G, retrieved Nov. 7, 2018.
ONTEL AA-MC4 Arctic Air Personal Space & Portable Cooler | The Quick & Easy Way to Cool Any Space, As Seen on TV, www.amazon.com/AA-MC4-Arctic-Personal-Portable-Cooler/dp/B0787DD3RX, retrieved Oct. 31, 2018.
EVAPOLAR AIR Cooler evaSMART EV-3000 Opaque White US Plug, www.amazon.com/dp/B075G1HBNW, retrieved Oct. 31, 2018.
Evapolar EV 1000CART Replacement Evaporative Cartridge for EV-1000 evaLIGHT Personal Air Cooler and Humidifer, www.amazon.com/Evapolar-EV1000CART-Replacement-Evaporative-Humidifier/dp/B06XT5B742, retrieved Oct. 31, 2018.
HoMedics MyChill Personal Space Cooler in Blue, www.amazon.com/HoMedics-MyChill-Personal-Space-Cooler/dp/B075564HQZ, retrieved Oct. 31, 2018.
Domus, vol. 767, Jan. 31, 1995, p. 108, Design Division of the Japan Patent Office.
Issuance of Notice of Grant for Japanese Design Application No. 2018-013816.
Filter for Personal Space Cooler, Arctic Air Cooler Replacement Filter Humidifier, www.amazon.com/dp/B07DGWMSH6/, retrieved Oct. 31, 2018.
Ontel Arctic Air Personal Space Cooler Replacement Filter Authentic OEM, www.amazon.com/dp/B07DQ6DXXC/, retrieved Oct. 31, 2018.
World's First Personal Air Cooler (EVAPOLAR), www.youtube.com/watch?v=k4NxBWPTqOA, published Aug. 23, 2016.
Global Sources Home Products, No. 10, vol. 8, p. 11, Docket No. HB26005377: Design Division of the Japan Patent Office; Nov. 27, 2014.

* cited by examiner

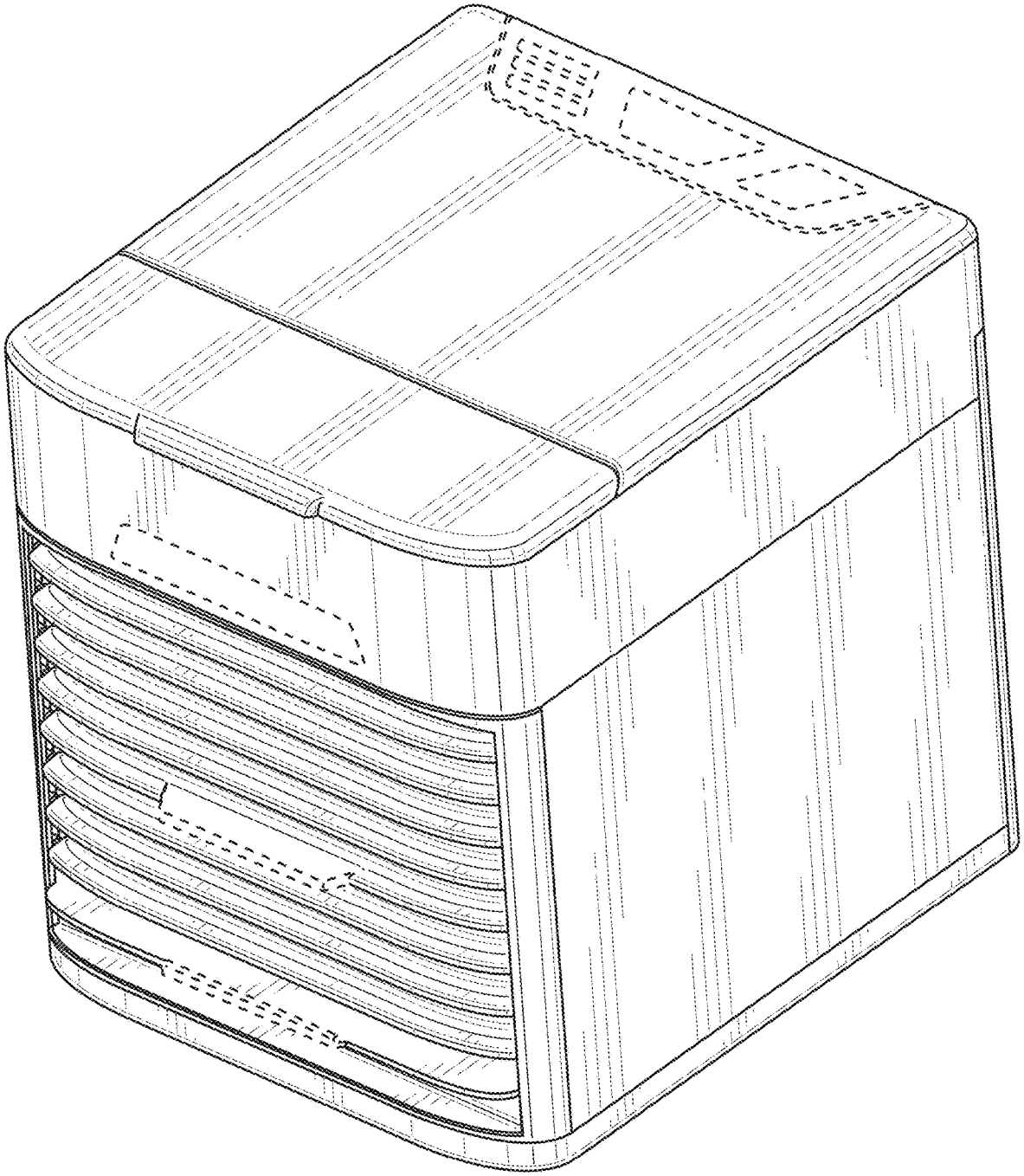
FIG. 1 (Amended)

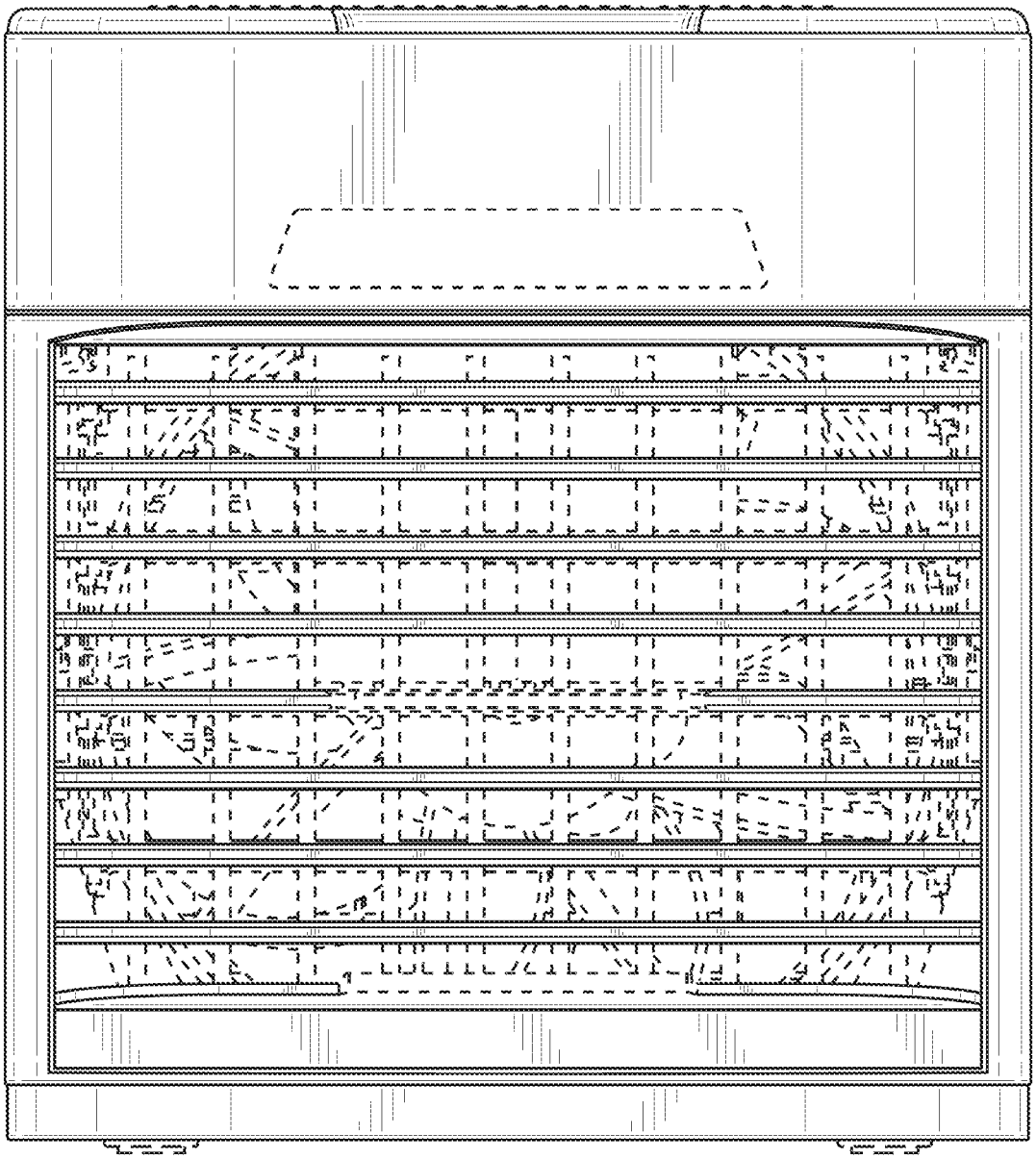
*FIG. 2 (Amended)*

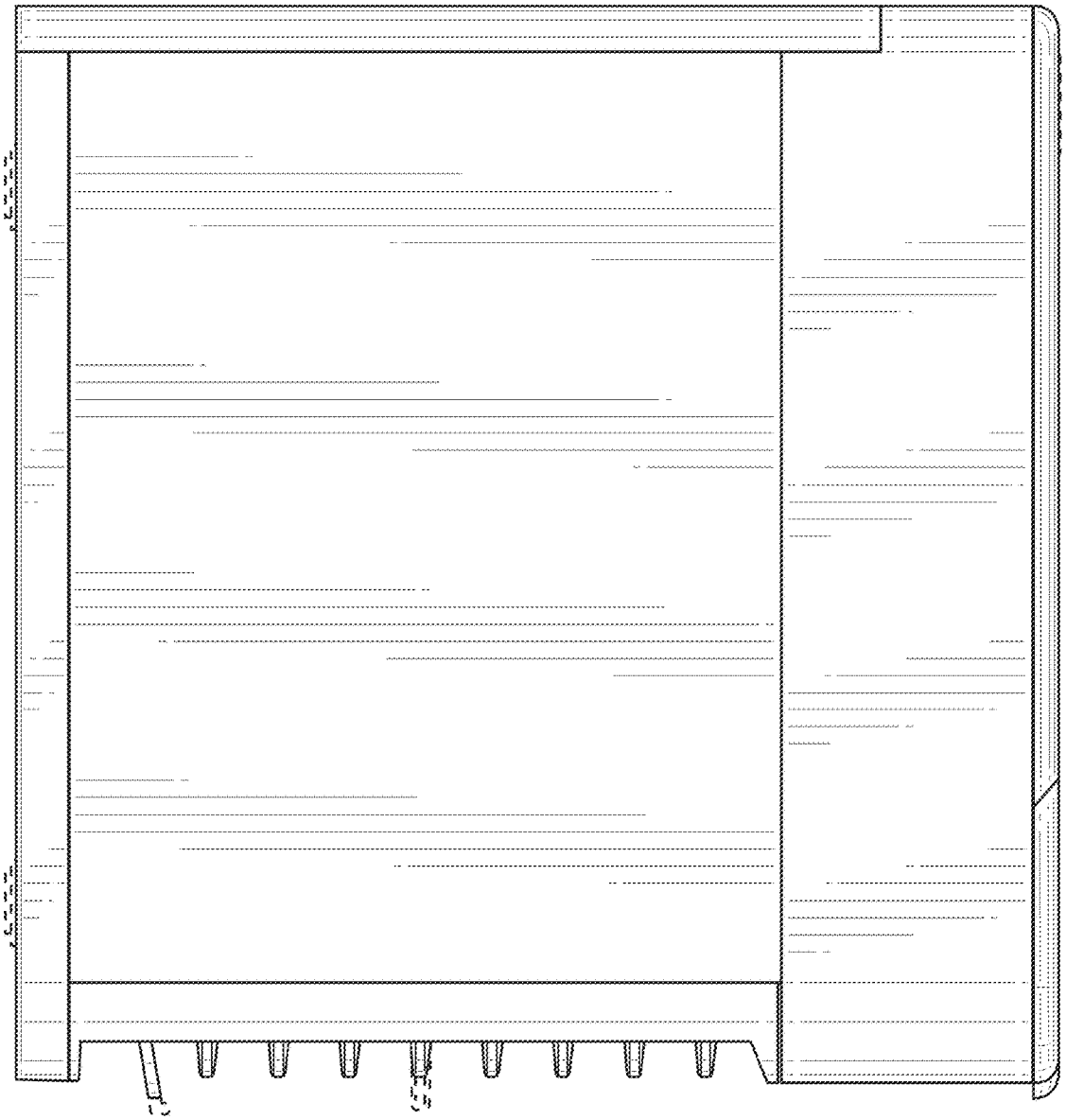
FIG. 3 (Amended)

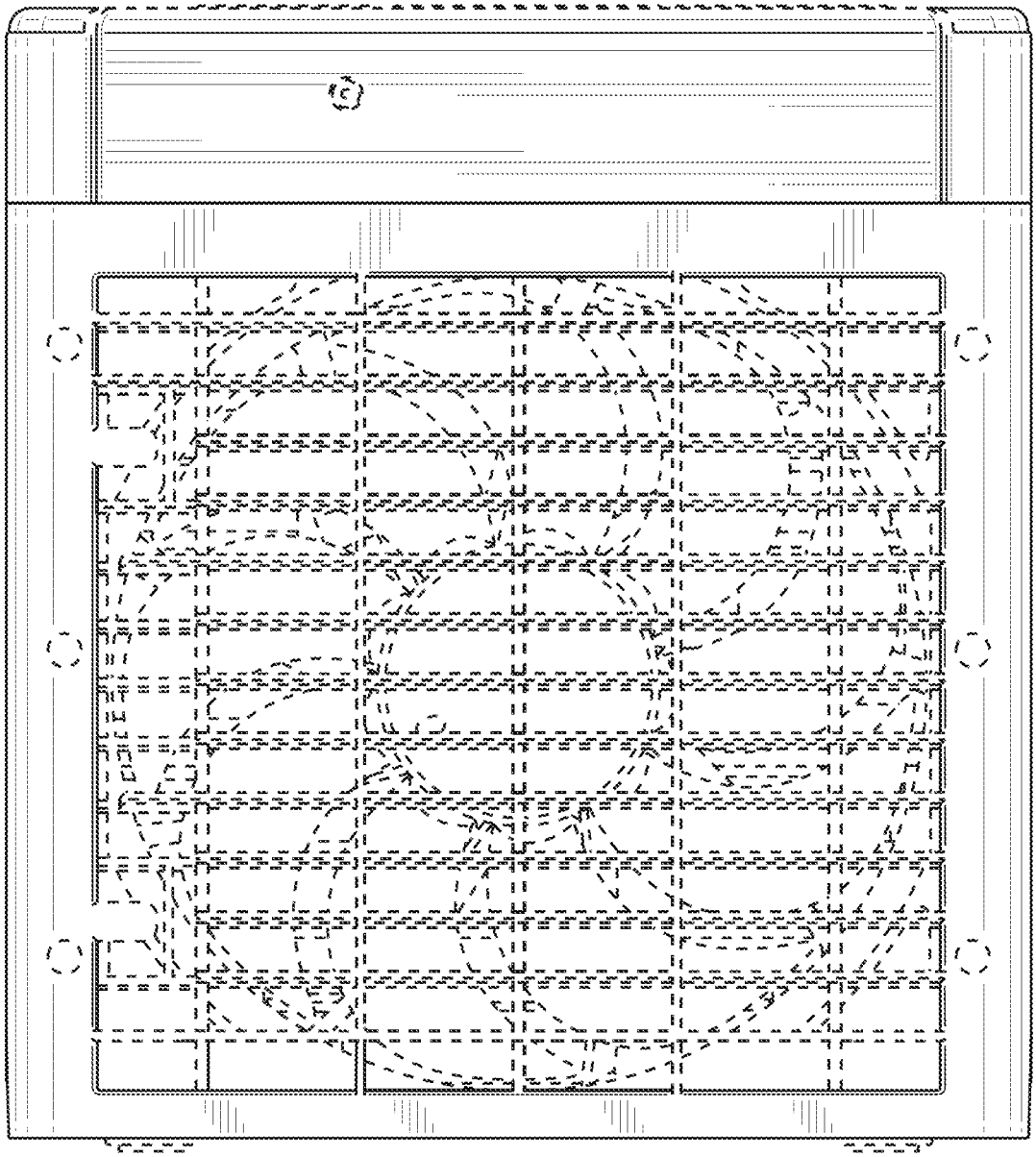
*FIG. 4 (Amended)*

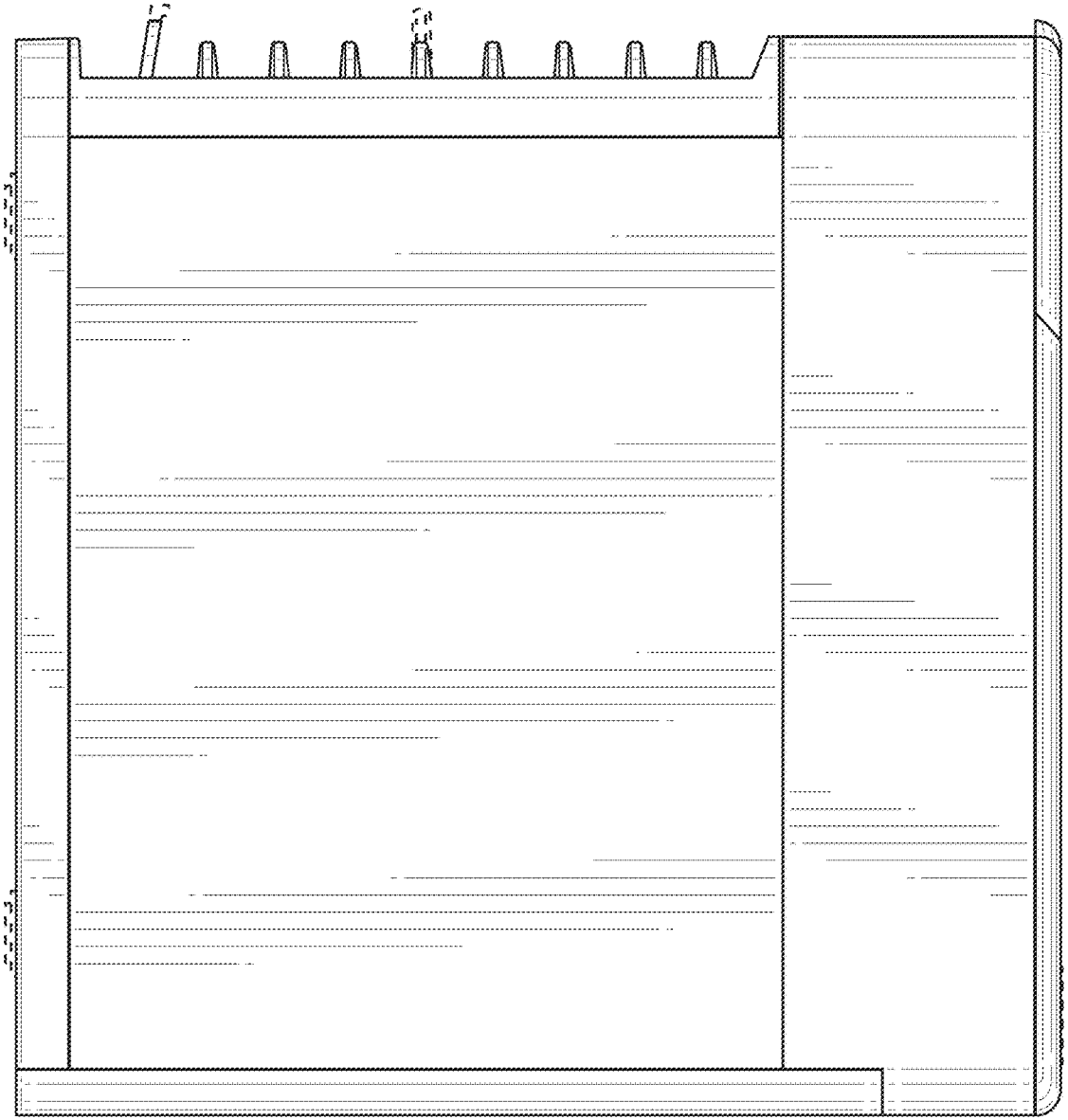
*FIG. 5 (Amended)*

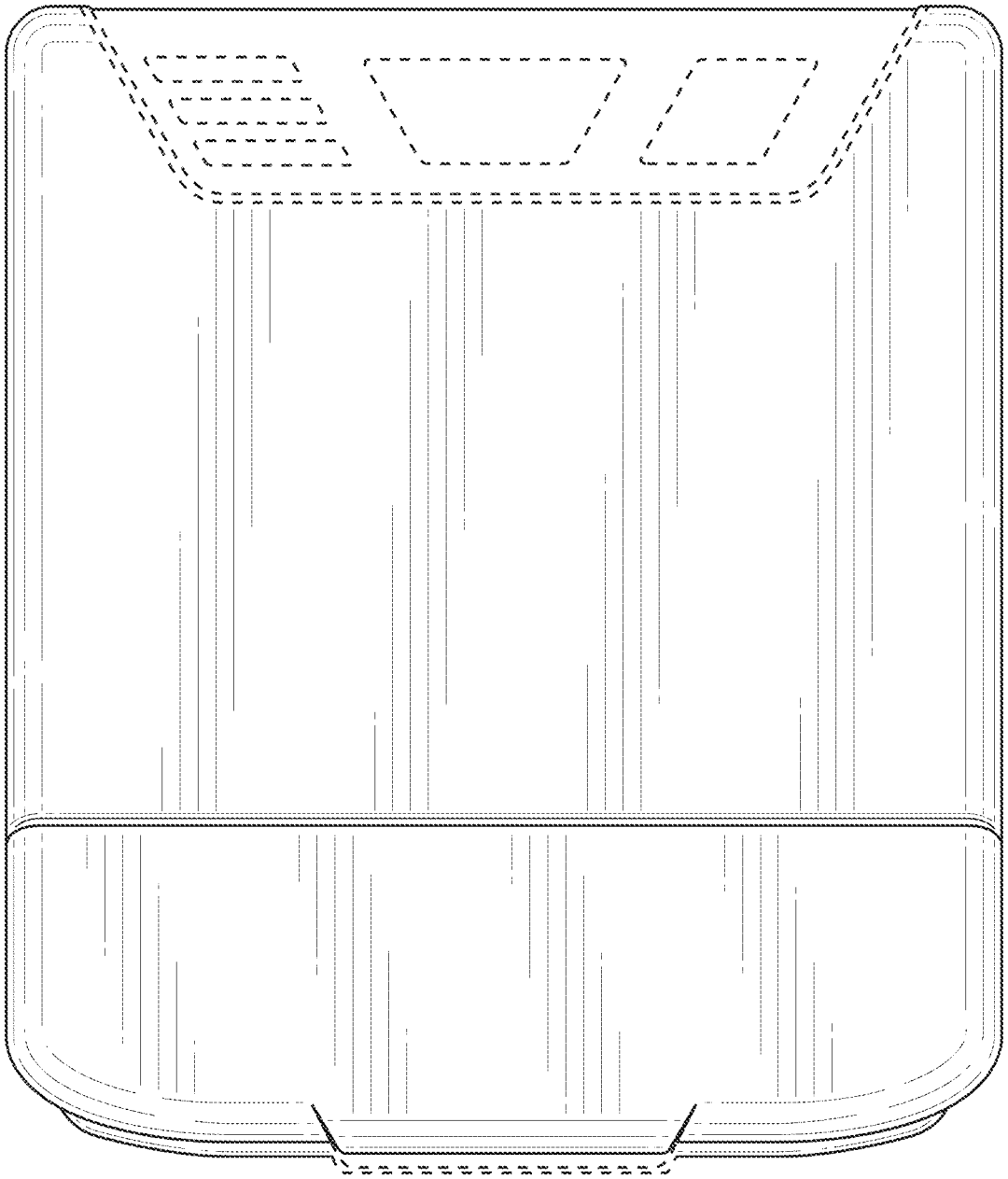
FIG. 6 (Amended)

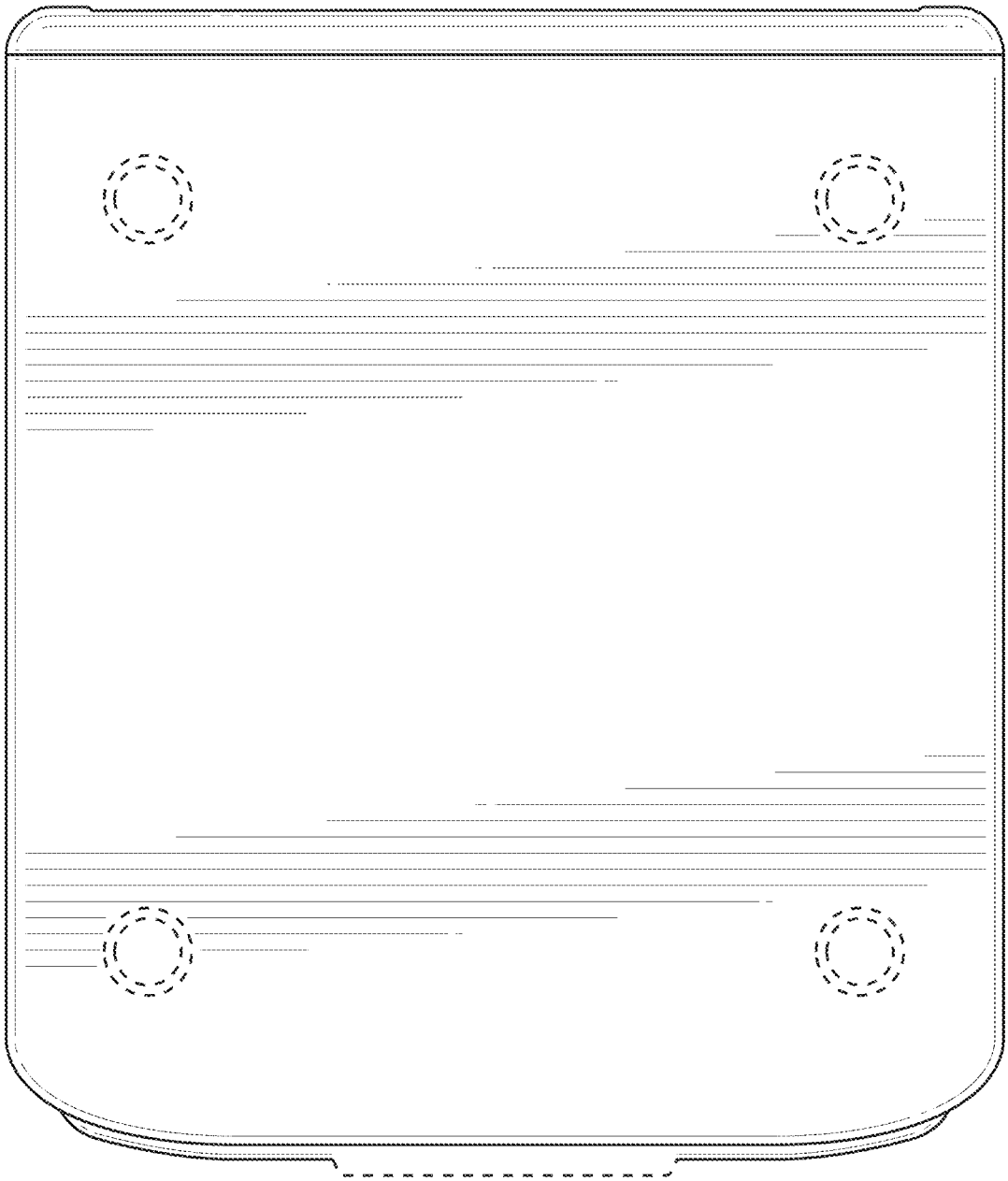
FIG. 7 (Amended)